United States Patent
Xiao et al.

(10) Patent No.: US 10,469,923 B2
(45) Date of Patent: Nov. 5, 2019

(54) ROUTING BAND-PASS FILTER FOR ROUTING OPTICAL SIGNALS BETWEEN MULTIPLE OPTICAL CHANNEL SETS

(71) Applicant: ALLIANCE FIBER OPTIC PRODUCTS, INC., Sunnyvale, CA (US)

(72) Inventors: Qijun Xiao, Fremont, CA (US); Andy Fenglei Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 15/851,872

(22) Filed: Dec. 22, 2017

(65) Prior Publication Data

US 2019/0200104 A1 Jun. 27, 2019

(51) Int. Cl.
*H04J 14/00* (2006.01)
*H04Q 11/00* (2006.01)
*H04J 14/02* (2006.01)
*G02B 6/293* (2006.01)

(52) U.S. Cl.
CPC ....... *H04Q 11/0005* (2013.01); *G02B 6/2938* (2013.01); *H04J 14/0242* (2013.01); *H04Q 2011/0009* (2013.01); *H04Q 2011/0016* (2013.01)

(58) Field of Classification Search
CPC ....... H04Q 11/0005; H04Q 2011/0009; H04Q 2011/0016; H04J 14/0242
USPC .......................................................... 398/49
See application file for complete search history.

(56) References Cited

U.S. PATENT DOCUMENTS

| 6,751,373 | B2 | 6/2004 | Jeong |
| 7,843,644 | B1* | 11/2010 | Wang ..................... G02B 6/262 |
| | | | 359/641 |
| 2002/0154857 | A1 | 10/2002 | Goodman et al. |
| 2008/0166094 | A1 | 7/2008 | Bookbinder et al. |
| 2009/0169163 | A1 | 7/2009 | Abbott, III et al. |
| 2015/0208144 | A1* | 7/2015 | Holmes ................... H04J 14/02 |
| | | | 398/48 |
| 2016/0192042 | A1* | 6/2016 | Mitchell ............ H04Q 11/0005 |
| | | | 398/48 |
| 2017/0254958 | A1 | 9/2017 | Yue |

(Continued)

OTHER PUBLICATIONS

International Search Report and Written Opinion PCT/US2018/061243 dated Feb. 26, 2019; 14 Pgs.

*Primary Examiner* — Don N Vo
(74) *Attorney, Agent, or Firm* — Adam R. Weeks

(57) ABSTRACT

Disclosed herein is a routing band-pass filter for routing optical signals between multiple optical channel sets. In particular, disclosed is a wavelength-division multiplexing (WDM) optical assembly including a first WDM filter, a second WDM filter, and a first routing filter. The first and second WDM filter are in communication with first and second sets of channel ports, respectively. The routing filter has a routing passband and forms a primary routing optical path for signals outside the routing passband between the first WDM filter and a common port. The routing filter also forms a secondary routing optical path for signals within the routing passband between the second WDM filter and the common port. The routing band-pass filter increases the number of channel ports in optical communication with a common port while maintaining signal integrity and increasing speed.

13 Claims, 13 Drawing Sheets

(56) References Cited

U.S. PATENT DOCUMENTS

2018/0128983 A1    5/2018  Huang et al.
2018/0167157 A1*   6/2018  Kim .................... H04J 14/0212

* cited by examiner

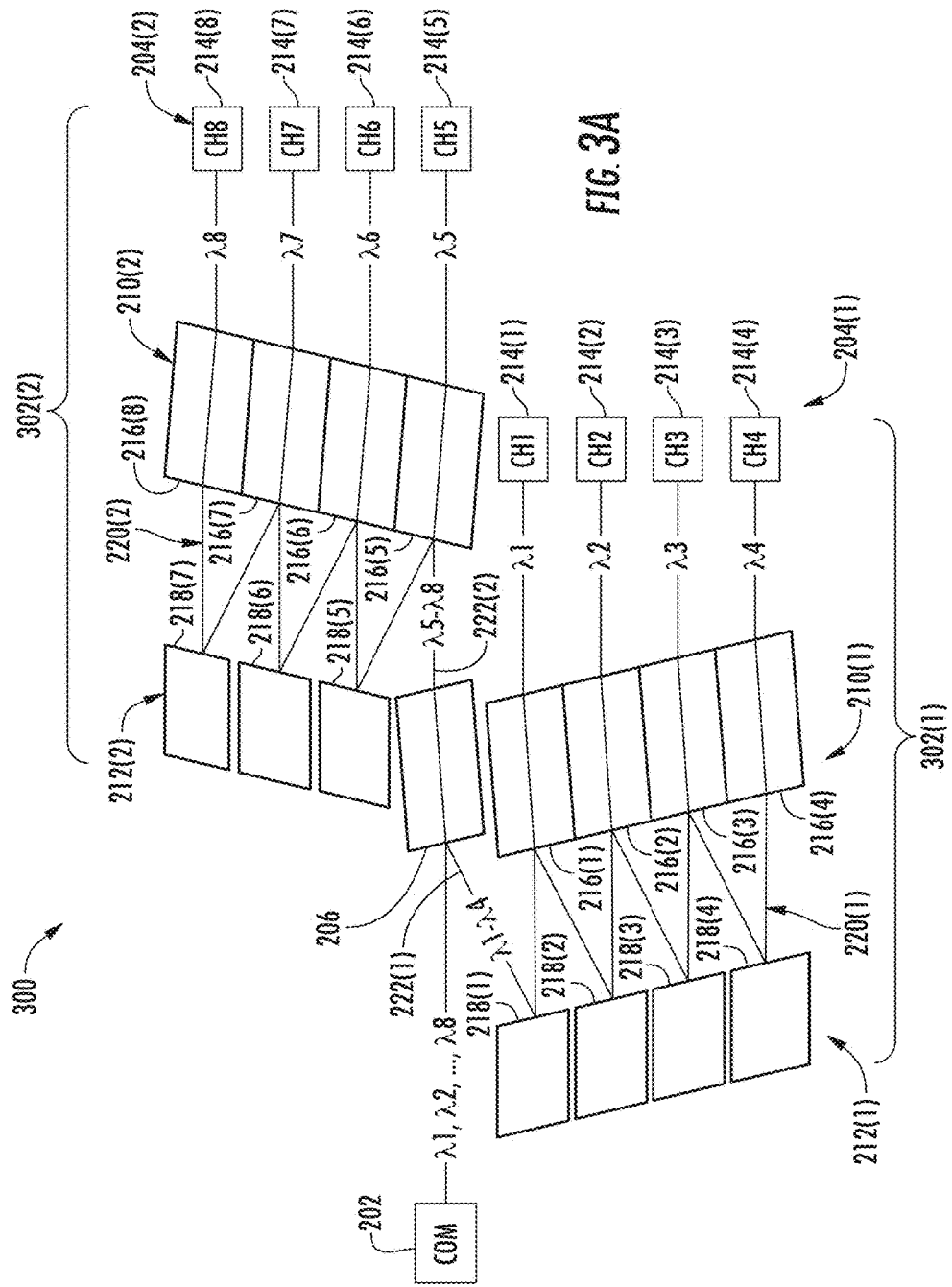

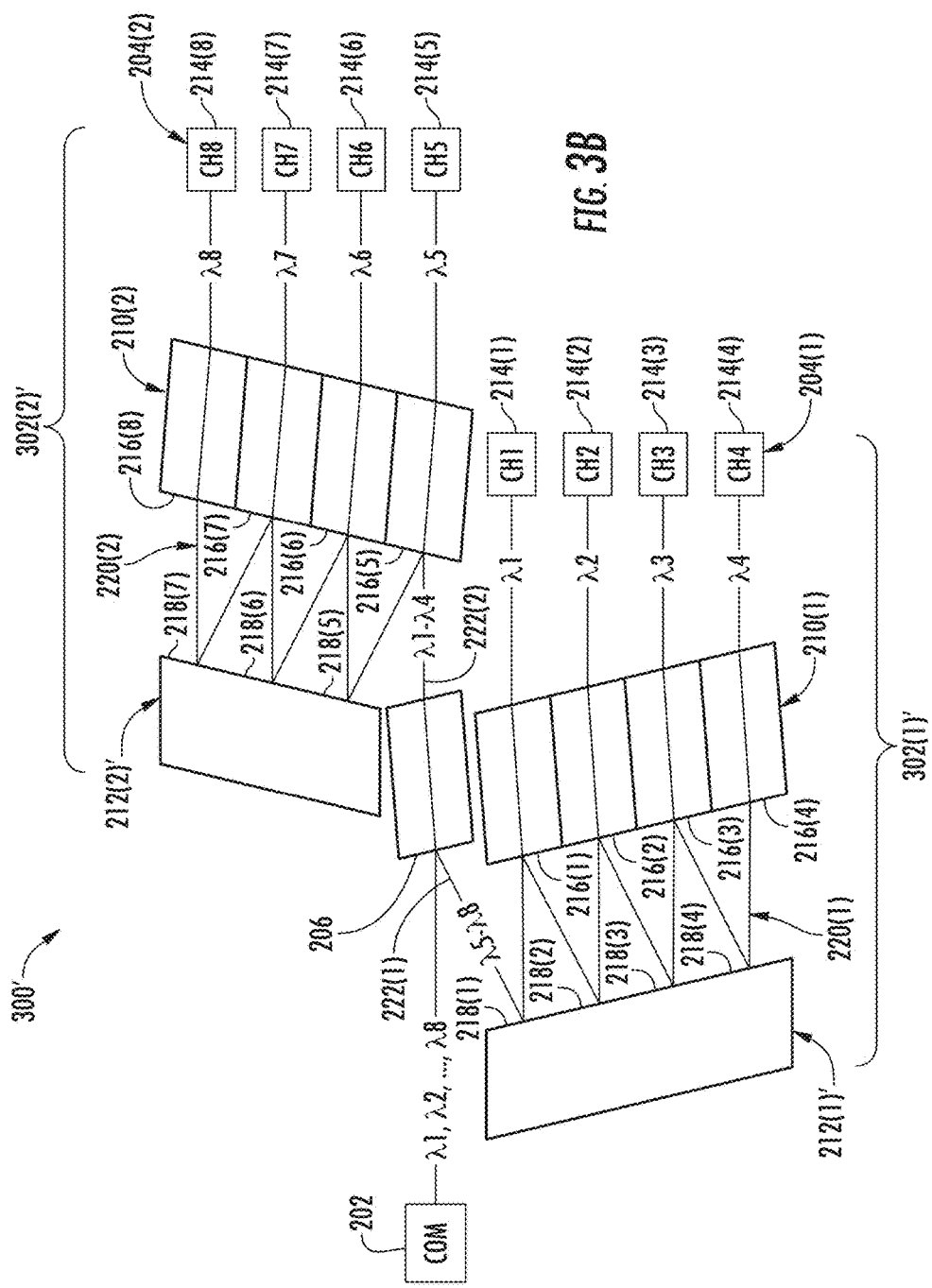

ROUTING BAND-PASS FILTER FOR ROUTING OPTICAL SIGNALS BETWEEN MULTIPLE OPTICAL CHANNEL SETS

BACKGROUND

The disclosure relates to wavelength-division multiplexing and demultiplexing, and more particularly, to WDM optical assemblies using a routing band-pass filter for routing optical signals between multiple optical channel sets.

Wavelength-division multiplexing (WDM) is a technology that multiplexes (e.g., adds) a number of distinct wavelengths of light onto a single optical fiber and demultiplexes (e.g., divides) a number of distinct wavelengths of light from a single optical fiber, thereby increasing information capacity and enabling bi-directional flow of signals. Multiple optical signals are multiplexed with different wavelengths of light combined by a multiplexer at a transmitter, directed to a single fiber for transmission of the signal, and split by a demultiplexer to designated channels at a receiver. By combining multiple channels of light into a single channel, WDM assemblies and associated devices can be used as components in an optical network, such as a passive optical network (PON).

There is an increasing need for faster transceivers, and accordingly, transceivers with more channels (as electronic signal speed cannot increase unlimitedly). However, increasing the number of channels may result in optical signal loss depending on the configuration. For example, beam splitting may provide the ability to deliver signals from one common port to two different subgroups of channel ports, but there may be a significant signal or power loss as a result.

As another example, FIG. 1 is a diagram illustrating a WDM optical assembly 100 including a single WDM common port 102 in optical communication with a single array 103 of eight WDM channel ports 104(1)-104(8) by a plurality of WDM filters 106(1)-106(8) and reflective surfaces 108(1)-108(7). The WDM filters 106(1)-106(8) and the reflective surfaces 108(1)-108(7) are arranged to form an optical path 110 between the common port 102 and each of the eight channel ports 104(1)-104(8). In particular, each of the WDM filters 106(1)-106(8) has a unique passband to allow a portion of the optical signal to pass through the WDM filters 106(1)-106(8) and to reflect the remaining portion of the optical signal towards the reflective surfaces 108(1)-108(7), which in turn reflect the remaining portion of the optical signal towards another one of the remaining WDM filters 106(2)-106(8). In this way, increasing the number of channel ports 104(1)-104(8) increases the number of reflections (i.e., zig-zags) of the optical path 110. Increasing the number of reflections may decrease speed (due to increasing the length of the optical path 110) and may decrease signal quality (as there may be a signal loss each time the signal bounces off of a reflective surface 108(1)-108(7) or if reflective surfaces are slightly misaligned). Accordingly, with the configuration shown in FIG. 1, the more channels that are added, the potential for increased signal loss and slower speeds. Further, with the configuration shown in FIG. 1, more channel ports 104(1)-104(8) may also increase the difficulty, time, and cost of assembling and tuning those channel ports 104(1)-104(8) (with respect to the common port 102).

No admission is made that any reference cited herein constitutes prior art. Applicant expressly reserves the right to challenge the accuracy and pertinency of any cited documents.

SUMMARY

Disclosed herein is a routing band-pass filter for routing optical signals between multiple optical channel sets. In particular, disclosed is a wavelength-division multiplexing (WDM) optical assembly including a first WDM filter, a second WDM filter, and a first routing filter. The first WDM filter has a first WDM passband and forms a first set of optical paths with a first set of channel ports. The second WDM filter has a second WDM passband and forms a second set of optical paths with a second set of channel ports. The routing filter has a routing passband and forms a primary routing optical path for signals outside the routing passband between the first WDM filter and a common port. The routing filter also forms a secondary routing optical path for signals within the routing passband between the second WDM filter and the common port. In this way, the routing filter limits the number of reflective surfaces needed to communicate with the first set of channel ports and the second set of channel ports. These multiple smaller sets of channel ports are easier to tune, less costly to manufacture, and have increased reliability compared to a single larger set of channel ports. Accordingly, the routing band-pass filter increases the number of channel ports in optical communication with a common port while maintaining signal integrity (avoiding signal loss) and increasing speed.

One embodiment of the disclosure relates to a wavelength-division multiplexing (WDM) optical assembly. The WDM optical assembly includes a first WDM filter, a second WDM filter, and a first routing filter. The first WDM filter has a first WDM passband. The first WDM filter is positioned to form a first set of optical paths with a first channel port and a second channel port. The second WDM filter has a second WDM passband. The second WDM filter is positioned to form a second set of optical paths with a third channel port, and a fourth channel port. The first routing filter has a first routing passband. The first routing filter is positioned relative to the first WDM filter to form a first primary routing optical path for signals outside the first routing passband. The first primary routing optical path is between the first WDM filter and a common port configured for optical communication of multiplexed signals. The first routing filter is positioned relative to the second WDM filter to form a first secondary routing optical path for signals within the first routing passband. The first secondary routing optical path is between the second WDM filter and the common port.

An additional embodiment of the disclosure relates to a WDM optical assembly. The WDM optical assembly includes a WDM filter and a routing filter. The WDM filter has a WDM passband. The WDM filter is positioned to form a set of optical paths with a first channel port and with a second channel port via a reflective surface. The first channel port and the second channel port are each configured for optical communication of demultiplexed signals. The routing filter has a routing passband. The routing filter is positioned relative to the WDM filter to form a routing optical path for signals within the routing passband. The routing optical path between the WDM filter and a common port is configured for optical communication of multiplexed signals.

An additional embodiment of the disclosure relates to a method of manufacturing a WDM optical assembly. The method includes positioning a first WDM filter having a first WDM passband to form a first set of optical paths with a first channel port and with a second channel port via a reflective surface. The method further includes positioning a first routing filter having a first routing passband relative to the first WDM filter to form a first secondary routing optical path for signals within the routing passband. The first secondary routing optical path is between the first WDM filter and a common port configured for optical communication of multiplexed signals.

An additional embodiment of the disclosure relates to a WDM device. The WDM device includes a housing, a common collimator positioned within the housing, a common fiber optic pigtail operatively coupled to the first common collimator and extending from the housing, a first channel collimator positioned within the housing, a first channel fiber optic pigtail operatively coupled to the first channel collimator and extending from the housing, a second channel collimator positioned within the housing, a second channel fiber optic pigtail operatively coupled to the second channel collimator and extending from the housing, and a WDM optical assembly. The WDM optical assembly includes a first WDM filter and a first routing filter. The first WDM filter has a first WDM passband. The first WDM filter is positioned to form a first set of optical paths with the first channel collimator and the second channel collimator. The first routing filter has a first routing passband. The first routing filter is positioned relative to the first WDM filter to form a first secondary routing optical path for signals within the first routing passband. The first secondary routing optical path is between the common collimator and the first WDM filter.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 3A is a top view of another embodiment of the WDM optical assembly of FIG. 2 including a routing filter, two channel port arrays, and two reflective surface arrays;

FIG. 3B is a top view of another embodiment of the WDM optical assembly of FIG. 2 including a routing filter, two channel port arrays, and two monolithic reflective surface arrays;

DETAILED DESCRIPTION

Figure 1:
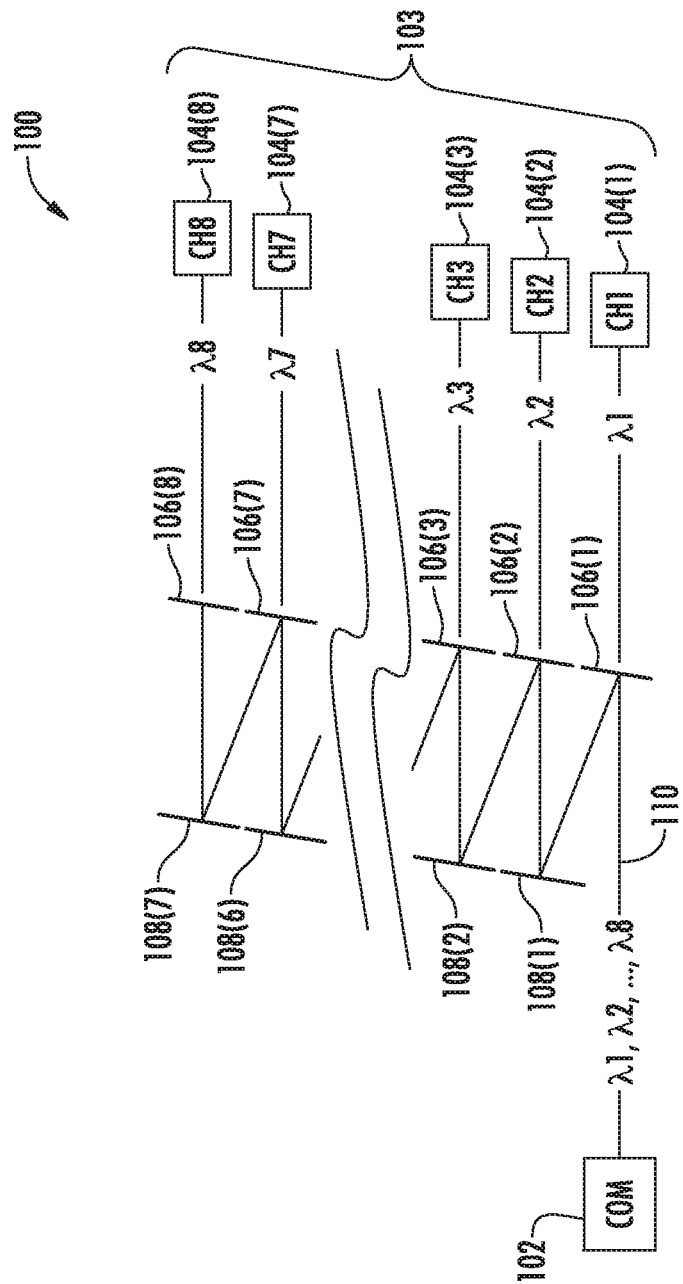
FIG. 1 is a diagram of an WDM optical assembly including a single WDM common port in optical communication with a single array of eight WDM channel ports.

Reference will now be made in detail to the present preferred embodiments, examples of which are illustrated in the accompanying drawings. Whenever possible, the same reference numerals will be used throughout the drawings to refer to the same or like parts.

The terms "left," "right," "top," "bottom," "front," "back," "horizontal," "parallel," "perpendicular," "vertical," "lateral," "coplanar," and similar terms are used for convenience of describing the attached figures and are not intended to limit this description. For example, the terms "left side" and "right side" are used with specific reference to the drawings as illustrated and the embodiments may be in other orientations in use. Further, as used herein, the terms "horizontal," "parallel," "perpendicular," "vertical," "lateral," etc., include slight variations that may be present in working examples.

Disclosed herein is a routing band-pass filter for routing optical signals between multiple optical channel sets. In particular, disclosed is a wavelength-division multiplexing (WDM) optical assembly including a first WDM filter, a second WDM filter, and a first routing filter. The first WDM filter has a first WDM passband and forms a first set of optical paths with a first set of channel ports. The second WDM filter has a second WDM passband and forms a second set of optical paths with a second set of channel ports. The routing filter has a routing passband and forms a primary routing optical path for signals outside the routing passband between the first WDM filter and a common port. The routing filter also forms a secondary routing optical path for signals within the routing passband between the second WDM filter and the common port. In this way, the routing filter limits the number of reflective surfaces needed to communicate with the first set of channel ports and the second set of channel ports (e.g., such that they could each require the same number of reflective surfaces). These multiple smaller sets of channel ports are easier to tune, less costly to manufacture, and have increased reliability compared to a single larger set of channel ports. Accordingly, the routing band-pass filter increases the number of channel ports in optical communication with a common port while maintaining signal integrity (avoiding signal loss) and increasing speed.

Figure 2:
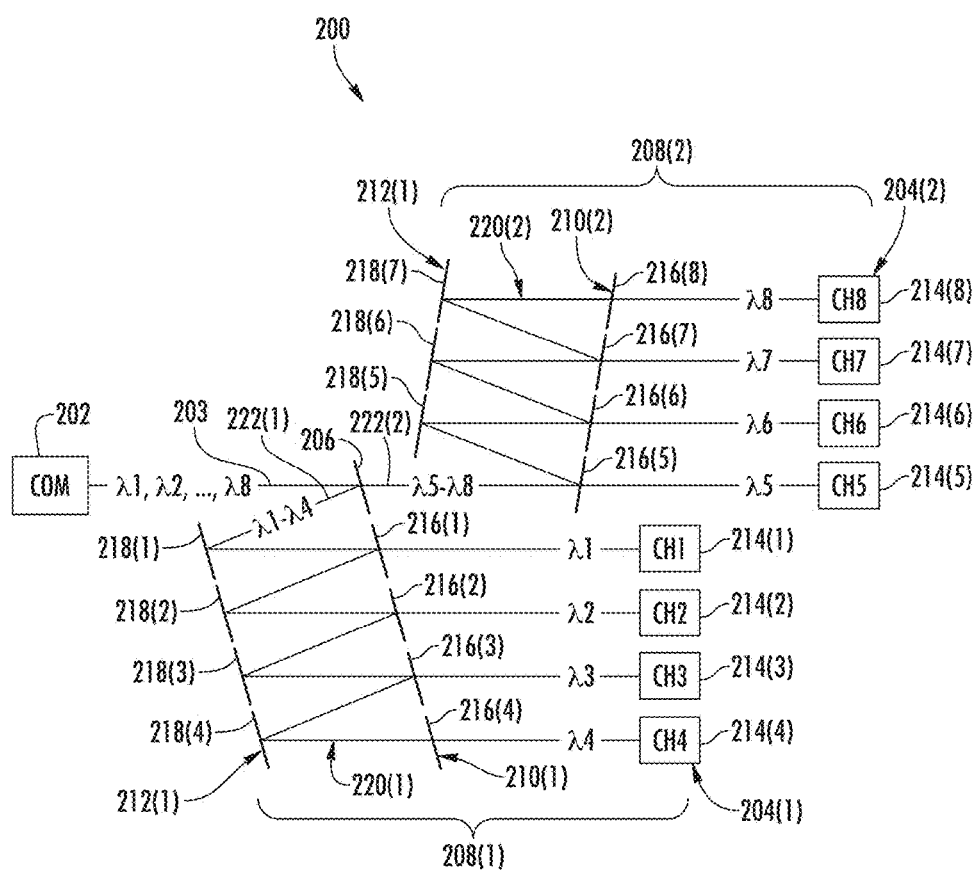
FIG. 2 is a diagram of an WDM optical assembly including a single WDM common port in optical communication with two channel port arrays via a routing filter.

FIG. 2 is a diagram of a WDM optical assembly 200 including a single WDM common port 202 in optical communication via a common signal path 203 with two channel port arrays 204(l), 204(2) via a routing filter 206 (also called a first routing filter). As used herein, the term port means a location or device at which a signal or signals enter the WDM optical assembly 200, exit the WDM optical assembly 200, or enter and exit the WDM optical assembly 200. The WDM optical assembly 200 illustrated in FIG. 2 includes a first optical subassembly 208(1) and a second optical subassembly 208(2). In certain embodiments, the first optical subassembly 208(1) is hierarchically cascaded relative to the second optical subassembly 208(2). In particular, the second optical subassembly 208(2) is positioned down signal from the first optical subassembly 208(1) in a hierarchical configuration. The splits signals are then respectively cascaded within the first optical subassembly 208(1) and the second optical subassembly 208(2). In this way, and as explained in more detail below, a first portion of the signal from the common port 202 is directed by the routing filter 206 to the first optical subassembly 208(1) while a second portion of the signal continues through the routing filter 206 to the second optical subassembly 208(2). As shown, at least a portion of the first optical subassembly 208(1) and at least a portion of the second optical subassembly 208(2) are positioned on opposite sides of the common signal path 203 and relatively horizontally offset from the common port 202 (e.g., at least a portion of the first optical subassembly 208(1) is closer to the common port 202 than any portion of the second optical subassembly 208(2)). However, other configurations may be used. For example, in one embodiment, the first optical subassembly 208(1) and second optical subassembly 208(2) are positioned on a same side of the common signal path 203. In another embodiment, the first optical subassembly 208(1) and the second optical subassembly 208(2) are equidistant from the common port 202.

The first optical subassembly 208(1) includes the first channel port array 204(1) (also called the first group of channel ports), a first WDM filter array 210(l), and a first reflective surface array 212(1). In particular, the first channel port array 204(1) includes four channel ports 214(1)-214(4) for communicating optical signals with the common port 202. The first WDM filter array 210(1) includes four WDM filters 216(1)-216(4) for multiplexing and demultiplexing optical signals communicated between the common port 202 and the channel ports 214(1)-214(4). The first reflective surface array 212(1) includes four reflective surfaces 218 (1)-218(4) (also called the first primary reflective surfaces) for routing optical signals between the common port 202 and the channel ports 214(1)-214(4). The four reflective surfaces 218(1)-218(4) could be independent from one another or monolithic. In addition, the first optical subassembly 208(1) may have more or less than four WDM filters 216(1)-216(4), channel ports 214(1)-214(4), and reflective surfaces 218(1)-218(4).

The WDM filters 216(1)-216(4) are positioned in a cascaded configuration. In particular, each of the WDM filters 216(1)-216(4) has a unique passband to allow a portion of the optical signal to pass through the WDM filter 216(1)-216(4) and to reflect the remaining portion of the optical signal towards the reflective surfaces 218(1)-218(4), which in turn reflect the remaining portion of the optical signal towards another one of the remaining WDM filters 216(2)-216(4). Accordingly, the first optical subassembly 208(1) defines a first group of cascaded optical paths 220(1).

Similarly, the second optical subassembly 208(2) includes the second channel port array 204(2) (also called the second group of channel ports), a second WDM filter array 210(2), and a second reflective surface array 212(2). In particular, the second channel port array 204(2) includes four channel ports 214(5)-212(8) for communicating optical signals with the common port 202. The second WDM filter array 210(2) includes four WDM filters 216(5)-216(8) for multiplexing and demultiplexing optical signals communicated between the common port 202 and the channel ports 214(5)-214(8). The second reflective surface array 212(2) includes three reflective surfaces 218(5)-218(7) (also called the first secondary reflective surfaces) for routing optical signals between the common port 202 and the channel ports 214 (5)-214(8). The three reflective surfaces 218(5)-218(7) could be independent from one another or monolithic. In addition, there may be more or less than four channel ports 214(5)-212(8) and four WDM filters 216(5)-216(8), and more or less than three reflective surfaces 218(5)-218(7).

The WDM filters 216(5)-216(8) are positioned in a cascaded configuration to consecutively divide a signal among the WDM filters 216(5)-216(8). In particular, each of the WDM filters 216(5)-216(8) has a unique passband to allow a portion of the optical signal to pass through the WDM filter 216(5)-216(8) and to reflect the remaining portion of the optical signal towards the reflective surfaces 218(5)-218(7), which in turn reflect the remaining portion of the optical signal towards another one of the remaining WDM filters 216(6)-216(8). Accordingly, the second optical subassembly 208(2) defines a second set of cascaded optical paths 220(2).

It is noted that each channel port array 204(1), 204(2) includes four channel ports 214(1)-214(4), 214(5)-214(8), respectively, as this provides a high efficiency and exceeds a minimum threshold level of optical loss. However, fewer or more channel ports 214 may be included in each channel port array 204 and a corresponding number of WDM filters and reflective surfaces.

The routing filter 206 has a routing passband and forms a primary routing optical path 222(1) (also referred to herein as a first primary routing optical path) for signals outside the routing passband with the first optical subassembly 208(1), thereby routing optical signals between the common port 202 and the first WDM filter array 210(1). The routing filter 206 forms a secondary routing optical path 222(2) (also referred to herein as a first secondary routing optical path) for signals within the routing passband with the second optical subassembly 208(2), thereby routing optical signals between the common port 202 and the second WDM filter array 210(2). In other words, the routing filter 206 uses a passband to divide the multiplexed signal from the common port 202 into subgroups. For example, if common port 202 transmits a multiplexed signal with wavelengths $\lambda_1$-$\lambda_8$, then the routing filter 206 may divide the multiplexed signal into two multiplexed signals with a first multiplexed signal with wavelengths $\lambda_1$-$\lambda_4$ outside the routing passband and transmitted along a primary routing optical path 222(1) to the first optical subassembly 208(1) to be demultiplexed by the wavelength filters 216(1)-216(4) and transmitted to their respective channel ports 214(1)-214(4). The routing filter 206 transmits a second multiplexed signal with wavelengths $\lambda_5$-$\lambda_8$ within the routing passband and transmitted along a secondary routing optical path 222(2) to the second optical subassembly 208(2) to be demultiplexed by the wavelength filters 216(5)-216(8) and transmitted to their respective channel ports 214(5)-214(8). Use of the routing filter 206 and two optical subassemblies 208(1), 208(2) shortens the optical path between the common port 202 and the furthest channel port 214(8) (as the channel port 214(8) is not the last in a single large channel port array).

The routing filter 206 limits the number of reflective surfaces 218 needed for the common port 202 to communicate with the first channel port array 204(1) and the second channel port array 204(2). In particular, in the example shown, the first set of optical paths 220(1) reflects against the reflective surfaces 218(1)-218(4) a maximum of four times, and the second set of optical paths 220(2) reflects against the reflective surfaces 218(5)-218(7) a maximum of three times. This is decreased from a single large channel port array, such as the example illustrated in FIG. 1, which would necessitate a larger number of reflections. Of course other configurations are possible. For example, the reflective surface arrays 212(1), 212(2) could instead be replaced with another WDM filter array, such that channel ports are positioned on opposite sides of one another.

These multiple smaller optical subassemblies 208 (and associated channel port arrays 204(1), 204(2)) are also more manageable and easier to tune, as fewer successive reflective surfaces 218 and WDM filters 216 need to be aligned. In general, the greater the number of successive reflective surfaces and WDM filters, the higher the tolerance variations stack in a successive reflective optical path. As a result, these multiple smaller optical subassemblies 208 (and associated channel port arrays 204(1), 204(2)) are less costly to manufacture and have increased reliability compared to a single larger set of channel ports. Accordingly, the routing bandpass filter 206 increases the number of channel ports 214 in optical communication with a common port 202 while maintaining signal integrity (avoiding signal loss) and increasing speed.

FIG. 3A is a top view of another embodiment of the WDM optical assembly of FIG. 2 including a routing filter 300, two channel port arrays 204(1), 204(2), and two reflective surface arrays 212(1), 212(2). In particular, the WDM optical assembly 300 includes two optical subassemblies 302(1), 302(2), each with their own reflective surface arrays 212(1), 212(2). Each of the reflective surfaces 218(1)-218(7) within their respective reflective surface arrays 212(1), 212(2) are separate and independent. Accordingly, each reflective surface 218(1)-218(7) is independently tunable. In other words, each reflective surface 218(1)-218(7) may be individually oriented (e.g., translated, rotated, etc.), such as to tune the optical path 220(1), 220(2). Similarly, the WDM arrays 210(1), 210(2) are connected to one another, but in other embodiments may be separate. In this way, each WDM filter 216(1)-216(8) of the WDM filter arrays 210(1), 210(2) may be individually oriented (e.g., translated, rotated, etc.), such as to tune the optical path 220(1), 220(2). As discussed above, the routing filter 206 is placed in optical communication with the common port 202, and as described above, splits the optical signal path into a primary optical path 222(1) and a secondary optical path 222(2).

FIG. 3B is a top view of another embodiment of the WDM optical assembly of FIG. 2 including a routing filter 300', two channel port arrays 204(1), 204(2), and two monolithic reflective surface arrays 212(1)', 212(2)'. In particular, the WDM optical assembly 300' is the same as discussed with respect to FIG. 3A, except that the two optical subassemblies 302(1)', 302(2)', each include a monolithic reflective surface array 212(1)', 212(2)'. The reflective surfaces 218(1)-218(7) of the monolithic reflective surface arrays 212(1)', 212(2)' are not individually tunable, but are easier to manufacture.

Figure 4A:
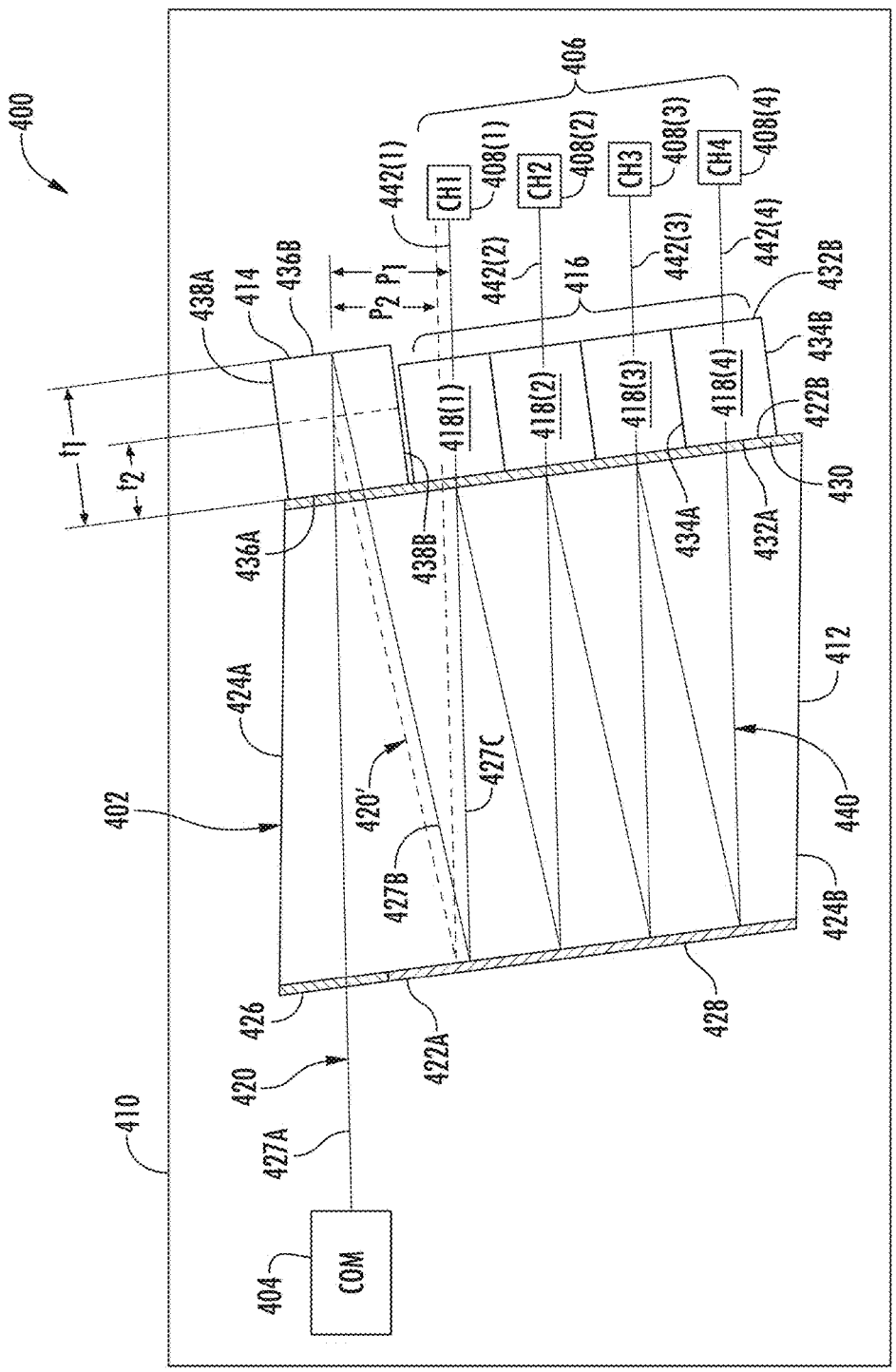
FIG. 4A is a top view of a WDM optical subassembly with a signal pitch router mounted to an optical signal router, the signal pitch router also being the filter router.
Figure 4B:
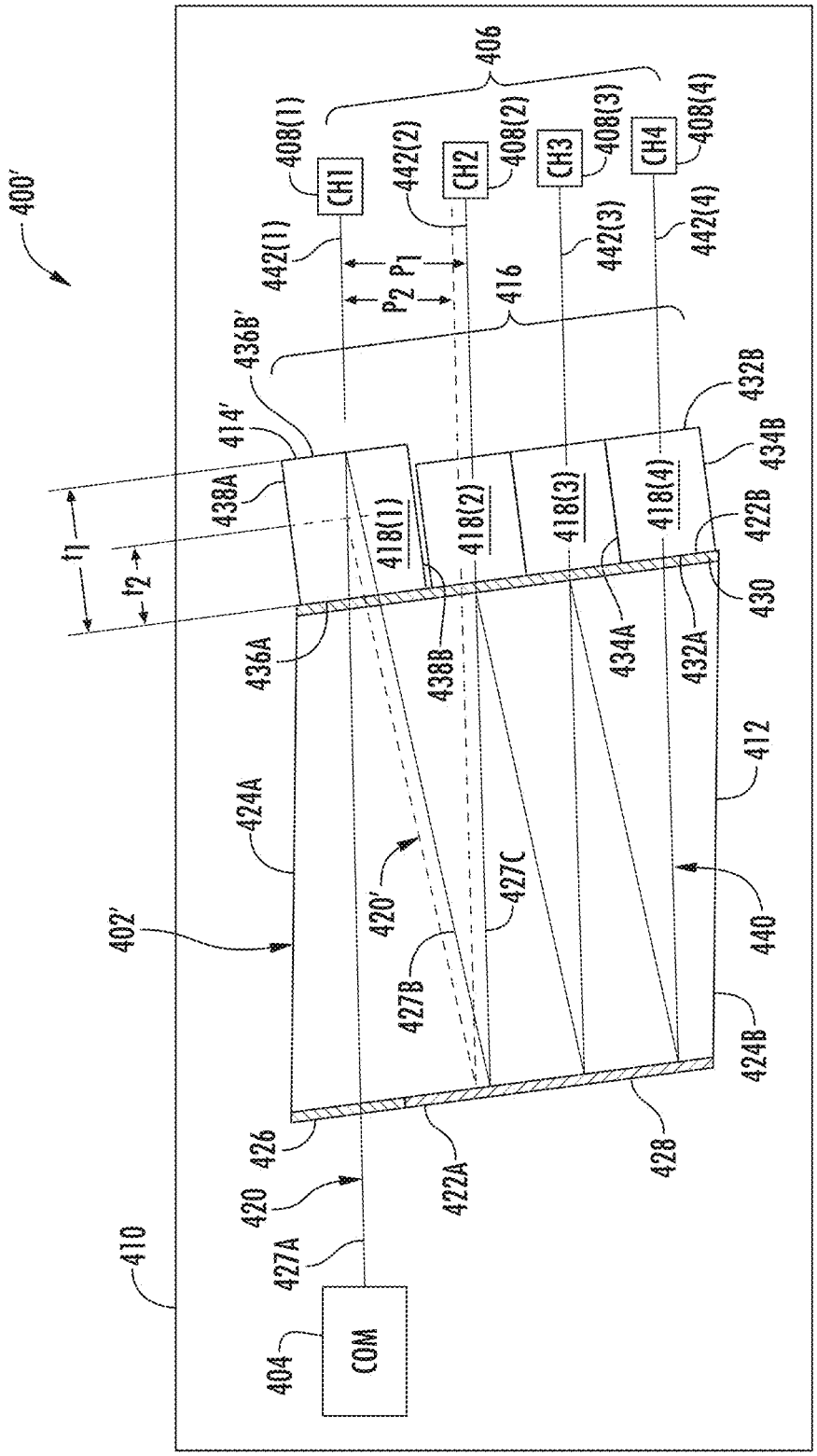
FIG. 4B is a top view of another embodiment of the WDM optical assembly of FIG. 4A with the signal pitch router embodied as a WDM filter.

FIGS. 4A-4B illustrate additional features and alternative embodiments of the WDM optical subassemblies discussed above with respect to FIGS. 2-3B.

FIG. 4A is a top view of a portion of a micro-optical assembly 400 (may also be referred to as a multiplexer/demultiplexer). The micro-optical assembly 400 includes a WDM optical assembly 402 (may also be referred to herein as a WDM optical subassembly), a common port 404, an channel port array 406 including a plurality of channel ports 408(1)-408(4) (referred to generally as channel ports 408, and may also be referred to as a plurality of input/output ports), and a substrate 410. In certain embodiments, the micro-optical assembly 400 may include a housing (not illustrated) that defines a WDM module.

The WDM optical assembly 402, common port 404, and/or channel ports 408 are typically mounted to and supported by an upper surface of the substrate 410. In certain embodiments, the common port 404 and/or the channel ports 408 may be embodied as collimators (e.g., micro-collimators) as described below with respect to FIGS. 8-12.

The WDM optical assembly 402 includes an optical signal router 412 (may also be referred to as a signal-routing block), a signal pitch router 414, and a WDM filter array 416 (may also be referred to as a capillary filter block), which includes a plurality of WDM filters 418(1)-418(4) (referred to generally as WDM filters 418, and may also be referred to as component filter blocks). The WDM optical assembly 402 forms an optical signal path 420 between the common port 404 and the channel ports 408.

The optical signal router 412 includes a first side 422A, a second side 422B opposite the first side 422A, and first and second lateral sides 424A, 424B extending between the first side 422A and the second side 422B. In particular, the sides 422A-424B generally form a parallelogram prism, where sides 422A, 422B are non-perpendicularly angled relative to first and second sides 424A, 424B. The first side 422A includes an anti-reflective (AR) coating 426 (may also be referred to as an AR film, AR portion, transmissive coating, transmissive film, transmissive portion, etc.) towards and extending from the first lateral side 422A. This anti-reflection coating 426 may comprise a multi-layer thin-film filter structure or a textured lens surface. A first portion 427A of the optical signal path 420 extends from the common port 404 through the AR coating 426 of the first side 422A.

The first side 422A of the optical signal router 412 also includes a highly-reflective (HR) coating 428 (may also be referred to as a HR film, HR portion, reflective coating, reflective film, reflective portion, etc.) towards and extending from the second lateral side 424B. As explained in more detail below, a second portion 427B of the optical signal path 420 is reflected off the HR coating 428 of the first side 422A of the optical signal router 412, where the third portion 427C of the optical signal path 420 continues to the first WDM filter 418(1).

The second side 422B of the optical signal router 412 includes an AR coating 430 along at least a portion of the second side 422B. In certain embodiments, the AR coating 430 extends the entirety of the second side 422B from the first lateral side 424A to the second lateral side 424B. In certain embodiments, at least a portion of the second side 422B includes a HR coating. The WDM filter array 416 (may also be referred to as a capillary filter block) is proximate to, mounted to, and/or abuts the second side 422B of the optical signal router 412. In some embodiments, for example, the WDM filters 418 are mounted to the second side 422B of the optical signal router 412. Each WDM filter 418(1)-418(4) includes a first surface 432A, a second surface 432B opposite the first surface 432A, and first and second lateral surfaces 434A, 434B extending between the first and second surfaces 432A, 432B.

Each of the first surfaces 432A of the WDM filters 418 is wavelength selective. In other words, the first surface 432A has a unique passband (e.g., coating, thin film filter, etc.) to allow a portion of the optical signal to pass through the WDM filter 418 and to reflect the remaining portion of the optical signal towards the HR coating 428 of the optical signal router 412, which in turn reflects the remaining portion of the optical signal towards another one of the remaining WDM filters 418. In particular, the first surface 432A (with the passband coating) of the WDM filters 418 is proximate to, mounted to, and/or abutting the second side 422B of the optical signal router 412. Accordingly, the WDM filters 418 share a common filter plane (against the second side 422B of the optical signal router 412). Mounting the WDM filters 418 against the second side 422B of the optical signal router 412 ensures that the optical signal path between successive WDM filters 418 remains within the optical signal router 412. In such a configuration, tuning is simplified, more reliable and more predictable, as the WDM filters 418 do not need to be individually tuned. If the WDM filters 418 are pressed against the second side 422B of the optical signal router 412, the optical path 420 within the optical signal router 412 is very reliable and predictable. Comparatively, if the first surface was transmissive and the second surface was wavelength selective, then each WDM filter 418 would have to be individually tuned to ensure that the optical signal is aligned with the respective channel port 408 and also aligned with successive WDM filters 418.

In certain embodiments, an index-matching adhesive is positioned between the WDM filter array 416 and the optical signal router 412. In certain embodiments, the WDM filters 416 of the WDM filter array 416 are secured together with a capillary adhesive. In particular embodiments, the capillary adhesive may comprise an epoxy resin and a polyamine hardener. In certain embodiments, the index-matching adhesive and the capillary adhesive may comprise different or substantially identical adhesives. In certain embodiments, the refractive index of the index-matching adhesive matches the refractive index of the optical signal router 412 and the WDM filters 418.

The WDM filter array 416 and the optical signal router 412 are arranged such that a multiplexed optical signal entering optical signal router 412 from the common port 404 can pass through the optical signal router 412 and between the WDM filters 418 of the WDM filter array 416 in a back-and-forth progression (e.g., routing optical path 440, discussed in more detail below) to successive ones of the WDM filters 418 for successive wavelength-selective transmission and reflection at the channel ports 408. Additionally, the WDM filter array 416 and the optical signal router 412 are arranged such that demultiplexed optical signals entering the optical signal router 412 from the channel ports 408 can pass through the optical signal router and between the WDM filters 418 of the WDM filter array 416 in a back-and-forth progression (e.g., routing optical path 440, discussed in more detail below) for multiplexing at successive ones of the WDM filters 418 and multiplexed transmission to the common port 404. In particular, the common port 404 serves as an input/output (I/O) port for a multi-wavelength light having wavelengths $\lambda_1$ to $\lambda_4$ while the channel ports 408 serve as the four individual channel ports. The WDM filters 418 are respectively configured to transmit wavelengths $\lambda_1$, $\lambda_2$, $\lambda_3$, and $\lambda_4$ and reflect the other wavelengths. In a DeMux operation, the multi-wavelength light exits the common port 404 that defines the I/O port and travels towards the first WDM filter 418(1). The first WDM filter 418(1) transmits the wavelength $\lambda_1$ to the first channel port 408(1) and reflects the remaining wavelengths $\lambda_2$, $\lambda_3$, and $\lambda_4$ of multi-wavelength light. This reflected multi-wavelength light then proceeds to the second WDM filter 418(2), which transmits the wavelength $\lambda_2$ to the second channel port 408(2) and reflects the remaining wavelengths $\lambda_3$ and $\lambda_4$ of multi-wavelength light. This process is repeated for the remaining two optical filters 418(3) and 418(4) and channel ports 408(2), 408(3) so that the wavelength components $\lambda_1$, $\lambda_2$, $\lambda_3$, and $\lambda_4$ of the multi-wavelength light are distributed to their respective channel ports 408(3), 408(4). In the Mux operation, the direction of the light is reversed and the individual wavelengths $\lambda_1$, $\lambda_2$, $\lambda_3$, and $\lambda_4$ from the individual channel ports 408(1)-408(4) are recombined by the optical filters 418(1)-418(4) into common port 404.

The signal pitch router 414 may also operate as a filter router, as explained in more detail below with respect to FIGS. 5-6.

Referring still to FIGS. 4A and 4B, the signal pitch router 414 has a first transmissive surface 436A (e.g., the entire first surface 436A includes a transmissive surface), a second reflective surface 436B (e.g., the entire second surface 436B includes a reflective surface) opposite the first transmissive surface 436A, and first and second lateral surfaces 438A, 438B extending between the first transmissive surface 436A and the second reflective surface 436B. The first transmissive surface 436A is positioned proximate to, mounted to, and/or abutting the second side 422B of the optical signal router 412. The second reflective surface 436B is positioned distally from the optical signal router 412. In certain embodiments, the second reflective surface 436B of the second surface 436B includes a wavelength selective surface. In certain embodiments, the second reflective surface 436B includes a mirror. In other words, the second reflective surface 436B of the signal pitch router 414 is offset from the common filter plane of the WDM filter array 416. In this way, a depth of the signal pitch router 414 (i.e., distance $T_1$ from the first transmissive surface 436A to the second reflective surface 436B) establishes a pitch of the optical path 420 within the optical signal router 412. Accordingly, during manufacturing of the WDM optical assembly 402, the pitch of the routing optical path 440 within the optical signal router 412 is tuned by configuring the signal pitch router 414 with a pre-determined thickness (e.g., by selecting one of a plurality of signal pitch routers of varying thicknesses). This provides for easier, faster, more reliable, and more cost effective manufacturing and assembly of the WDM optical assembly 402.

The optical routing path 420 extends at the first portion 427A from the common port 404, through the first side 422A of the optical signal router 412 through the AR coating 430 of the second side 422B of the optical signal router 412, through the first transmissive surface 436A of the signal pitch router 414 to the second reflective surface 436B of the signal pitch router 414. The second portion 427B of the optical signal path 420 is then reflected off the second reflective surface 436B of the signal pitch router 414 and extends back through the first surface 436A of the signal pitch router 414, through the second side 422B of the optical signal router 412, and to the HR coating 428 of the first side 422A of the optical signal router 412. The third portion 427C then proceeds to the first WDM filter 418(1). The portion of the optical signal path 420 within the optical signal router 412 may also be referred to as a routing optical path 440, and the portion of the optical signal path 420 outside of the signal router 412 may be referred to as an WDM optical path 442(1)-442(4). For example, the portion of the optical path 420 between the first WDM filter 418(1) and the first channel port 408 may be referred to as a first WDM optical path 442(1).

The pitch of the routing optical path 440 of the optical signal path 420 within the optical signal router 412 depends on the thickness of the signal pitch router 414. The pitch of the routing optical path 440 determines a distance between the portion of the optical routing path associated with the common port 404 (e.g., the first portion 427A of the optical routing path 420 in FIG. 4A) and the next adjacent WDM optical path (e.g., the first WDM optical path 442(1) in FIG. 4A). For example, a thickness of $T_1$ of the signal pitch router 414 results in a pitch $P_1$ of the optical signal path 420. However, a decreased thickness of $T_2$ (where $T_2$ is less than $T_1$), results in a pitch $P_2$ of the optical signal path 420', where pitch $P_2$ is less than pitch $P_1$. Accordingly, an increased thickness of the signal pitch router 414 results in an increased pitch. In this way, varying the thickness of the optical signal router 414 alters the pitch of the optical signal path 420 within the optical signal router 412. In particular, during manufacturing of the WDM optical assembly 402, the WDM filter array 416 can be mounted to the optical signal router 412. Then one of a plurality of signal pitch routers 414 of varying thicknesses can be chosen and used to tune the optical signal path 420 (the pitch of the optical signal path 420) within the optical signal router 412. This tuning may be needed to adjust alignment of the optical signal path 420 with respect to the WDM filters 418 and their respective channel ports 408.

In certain embodiments, the signal pitch router 414 is mounted to a different side of the optical signal router 412 than the WDM filters 418. For example, in certain embodiments, the common port 404 is on the same side of the optical signal router 412 as the channel ports 408. In such a circumstance, the signal pitch router 414 is positioned proximate to, mounted to, and/or abuts the first side 422A of the optical signal router 412.

In certain embodiments, the optical signal router 412, the signal pitch router 414, and/or the WDM filters 418 comprise glass blocks, such as glass blocks characterized by a refractive index of between about 1.523 and about 1.517, at 1300 nm. In certain embodiments, each of the plurality of WDM filters 418 is configured such that the wavelength-selective transmission and reflection at the channel ports 408 is operative between about 1260 nm and about 1360 nm and is characterized by a bandwidth and channel spacing of between about 10 nm and about 30 nm.

In certain embodiments, the WDM channels (i.e., the common port 404 and/or the channel ports 408) can be dense WDM (DWDM) channels or coarse WDM (CWDM) channels. The micro-optical assembly 400 can be used to form many types of free-space optical fiber devices, as well as compact variable optical attenuators, switches, optical amplifiers, taps, optical couplers/splitters, optical circulators, optical isolators, optical time-domain reflectometer (OTDRs), etc.

The common port 404, channel ports 408, and/or WDM optical assembly 402 can be secured to the upper surface of the substrate 410 using an adhesive, glass soldering and/or glass welding using a laser. In certain embodiments, no adhesive is used in securing the common port 404, channel ports 408, and/or WDM optical assembly 402 to the upper surface of the support substrate 410. A no-adhesive embodiment of the micro-optical assembly 400 may be preferred in cases where uncertainty in the reliability of the adhesive is a concern. In certain embodiments, the support substrate 410 is made of glass (e.g., quartz) or sapphire. In another embodiments, the support substrate 410 is made of a glass that is receptive to the formation of glass bumps. In other embodiments, the support substrate 410 can be made of stainless steel or silicon, a low-CTE metal alloy (e.g., having a CTE of <10 ppm/° C., or more preferably CTE<5 ppm/° C., or even more preferably CTE<1 ppm/° C.). Examples of metal alloys having such a low CTE include the nickel-iron alloy 64FeNi also known in the art under the registered trademarked INVAR® alloy or the nickel-cobalt ferrous alloy known in the art under the registered trademark KOVAR® alloy. In certain embodiments, the upper surface is precision polished to be flat to within a tolerance of 0.005 mm so that the collimators can be precision mounted to the upper surface. In certain embodiments, the bottom side of the collimators can be processed (e.g., polished, including laser performing laser polishing) to a tolerance similar to that of the upper surface of the support substrate. In certain embodiments, the support substrate 410 includes one or more reference features, such as alignment fiducials, for positioning and/or aligning the micro-collimators and other optical components (e.g., optical filters, other micro-collimators, etc.).

FIG. 4B is a top view of another embodiment of the WDM optical assembly of FIG. 4A with the signal pitch router 414' also functioning as a first WDM filter 418(1). The WDM optical assembly 402 operates as described above with respect to FIG. 4A, except where otherwise noted. In particular, the signal pitch router 414' includes a first transmissive surface 436A, a second wavelength selective surface 436B' opposite the first transmissive surface 436A, and first and second lateral surfaces 424A, 424B extending between the first transmissive surface 436A and the second reflective surface 436B'. The first transmissive surface 436A is positioned proximate to, mounted to, and/or abutting the second side 422B of the optical signal router 412. The second wavelength selective surface 436B' is positioned distally from the optical signal router 412.

As described above, the thickness of the signal pitch router 414' adjusts the pitch of the optical signal path 420 within the optical signal router 412. In the embodiment of FIG. 4B, the pitch determines a distance (e.g., $P_1$ or $P_2$) between the first WDM optical path 442(1) and the second WDM optical path 442(2). Additionally, the signal pitch router 414' acts as the first WDM filter 418(1) and transmits the wavelength $\lambda_1$ to the first channel port 408(l) and reflects the remaining wavelengths $\lambda_2$, $\lambda_3$, and $\lambda_4$ of multi-wavelength light. It is noted that, as above, the first surface 432A (with the passband coating) of the remaining WDM filters 418(2)-418(4) is proximate to, mounted to, and/or abutting the second side 422B of the optical signal router 412. Accordingly, the WDM filters 418(2)-418(4) share a common filter plane (against the second side 422B of the optical signal router 412) that is offset from the filter plane of the first WDM filter 418(1). In other words, the orientation of the first WDM filter 418(1) is flipped (i.e., reversed, backwards), from that of the other WDM filters 418(2)-418(4) mounted to the second side 422B of the optical signal router 402.

It is noted that in this embodiment, the coating 426' of the optical signal router 412 includes a band pass filter, such that the coating 426' operates as the filter router. In particular, a primary optical path 448A is formed at the coating 426' for signals outside the routing passband, and a secondary optical path 448B is formed at the coating 426' for signals within the routing passband. In other words, the secondary optical path of the coating 426' extends into the optical signal router 412.

Figure 5:
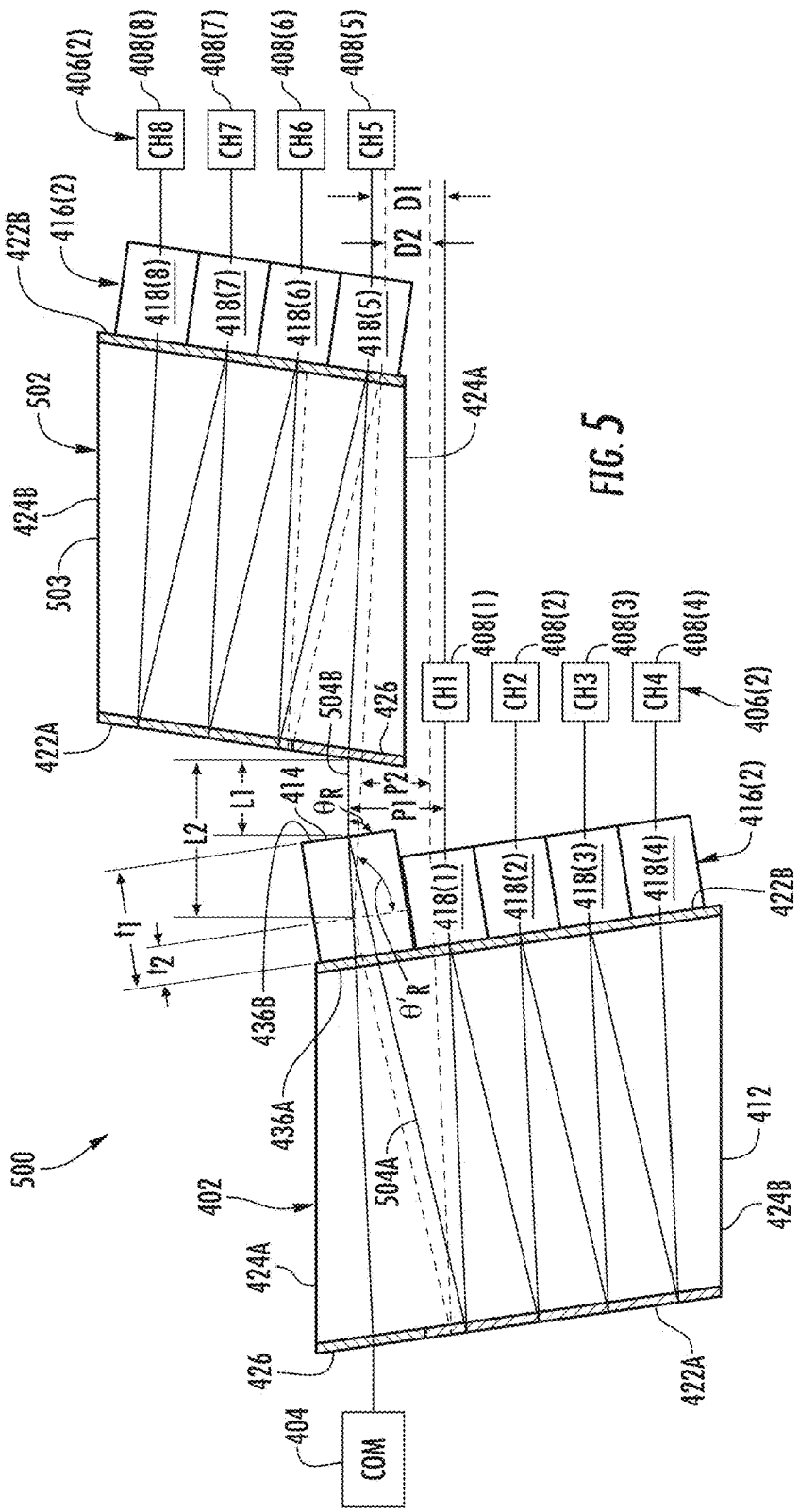
FIG. 5 is a top view illustrating one embodiment of the WDM optical assembly of FIG. 2 including a routing filter mounted to an optical signal router and two channel port arrays.

FIG. 5 is a top view illustrating another embodiment of the WDM optical assembly of FIG. 2 including the WDM optical subassembly 402 of FIG. 4A. In particular, the WDM optical assembly 500 includes the WDM optical subassembly 402 of FIG. 4A and a WDM optical subassembly 502. WDM optical subassembly 502 is similar to WDM optical subassembly 402 except that it does not include a signal pitch router 414. Accordingly, the optical signal router 503 of the WDM optical subassembly 502 is thinner than the optical signal router 412 of the WDM optical subassembly 402. Further, it is noted that the second WDM optical subassembly 502 (and in particular the optical signal router 503) is flipped vertically relative to the first WDM optical subassembly 402 (and in particular the optical signal router 412). In other words, the lateral sides 424A, 424B of the first optical signal router 412 are generally parallel with the lateral sides 424A, 424B of the second optical signal router 503, but the first and second surfaces 422A, 422B of the first optical signal router 412 are generally non-parallel with the first and second surfaces 422A, 422B of the second optical signal router 503. However, in other embodiments, the first and second surfaces 422A, 422B of the first optical signal router 412 are generally parallel with the first and second surfaces 422A, 422B of the second optical signal router 503.

For WDM optical subassembly 402, the second reflective surface 436B of the signal pitch router 414 includes a wavelength selective surface, such that the signal pitch router 414 operates as the filter router. In particular, a primary optical path 504A is formed at the second reflective surface 436B for signals outside the routing passband, and a secondary optical path 504B is formed at the second reflective surface 436B for signals within the routing passband. In other words, the primary optical path 504A of the second reflective surface 436B extends into the optical signal router 412. The secondary optical path extends past the second reflective surface 436B through the AR coating 426 of the first surface 422A of the optical signal router 502 of the second WDM optical subassembly 502 to the fifth WDM filter 418(5) of the second WDM filter array 416(2). Accordingly, the WDM optical assembly 500 operates similarly as the WDM optical subassemblies of FIGS. 2-4A, except where otherwise noted.

The signal pitch router 414 of the first WDM optical subassembly 402 operates as discussed with respect to FIG. 4B, except that it also affects alignment of the secondary optical path 504B with the second WDM optical subassembly 502. In particular, the angle of refraction $\theta_R$ of the secondary optical path 504B associated with a first thickness $T_1$ of the signal pitch router 414 is the same as the angle of refraction $\theta_R'$ associated with the second thickness $T_2$ of the signal pitch router 414 (or any other thickness of the signal pitch router 414). However, decreasing the thickness of the signal pitch router 414 increases the distance between the second surface 436B of the signal pitch router 414 and the first surface 422A of the optical signal router 503 of the second WDM optical subassembly 502. Accordingly, for a signal pitch router 414 with a decreased thickness ($T_2$), the secondary optical path 504B will intersect the first surface 422A closer to the first lateral side 424B. Conversely, for a signal pitch router 414 with an increased thickness, the secondary optical path 504B will intersect the first surface 422A closer to the second lateral side 424A. Further, as the thickness of the signal pitch router 414 is decreased, the distance $P_1$ between the optical path 506 at the first channel port 108(1) and the optical path 508 at the fifth channel port 108(5) (may also be referred to as the critical pitch) decreases. In this way, the signal pitch router 414 of the WDM optical subassembly 402 can tune both the first WDM optical subassembly 402 and the second WDM optical subassembly 502. It is noted that changing the thickness of the signal pitch router 414 changes the pitch of the optical signal path 420 within the first signal router 412(1) to a greater degree relative to the change in pitch of the optical signal path 420 within the second signal router 412(2).

Figure 6:
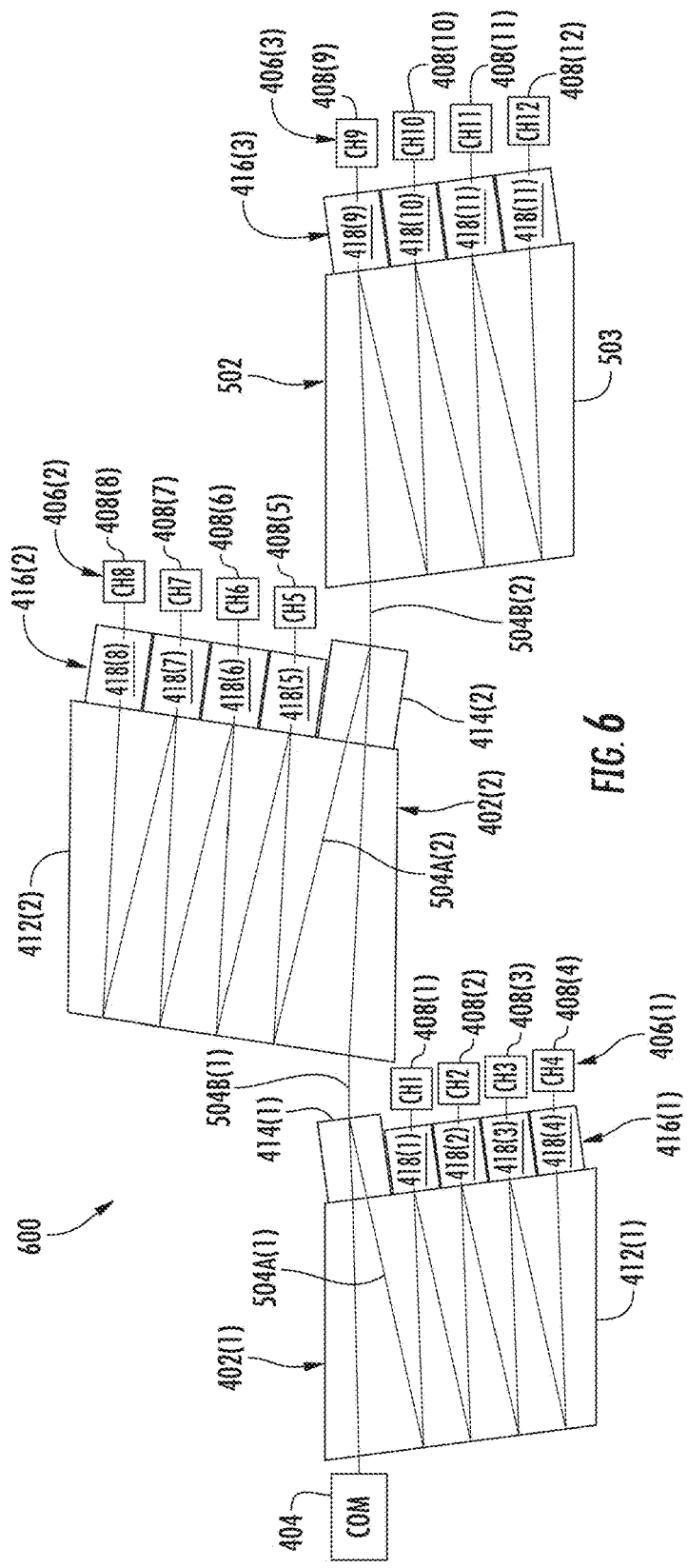
FIG. 6 is a top view illustrating another embodiment of the WDM optical assembly of FIG. 2 including two routing filters mounted to two optical signal routers, respectively, and three channel port arrays.

FIG. 6 is a top view illustrating another embodiment of the WDM optical assembly of FIG. 2 including three WDM optical subassemblies. The WDM optical assembly 600 includes two WDM optical subassemblies 402 of FIG. 4A, and WDM optical subassembly 502 of FIG. 5. In particular, the first routing filter 414(1) forms a first primary optical path 504A(1) and a first secondary optical path 504B(1), and the second routing filter 414(2) is placed within the first secondary routing optical path 504B(1). The second routing filter 414(2) forms a second primary optical path 504A(2) (also referred to herein as a second primary routing optical path) and a second secondary optical path 504B(2) (also referred to herein as a second secondary routing optical path). The third WDM optical subassembly also includes a plurality of third WDM filters 416(3) (i.e., 418(9), 418(10), 418(11), and 418(12)), at least one second secondary reflective surface and a channel port array 406(3) (i.e., channel ports 408(9), 408(10), 408(11) and 408(12)).

As shown, as the number of WDM optical subassemblies 402 (and by association the number of channel ports 408) increases, the number of reflections does not. Accordingly, even more WDM optical subassemblies 402 may be added, each with their own filter router. This of course may be applied to any of the WDM optical subassemblies discussed above with respect to FIGS. 2-6.

Figure 7:
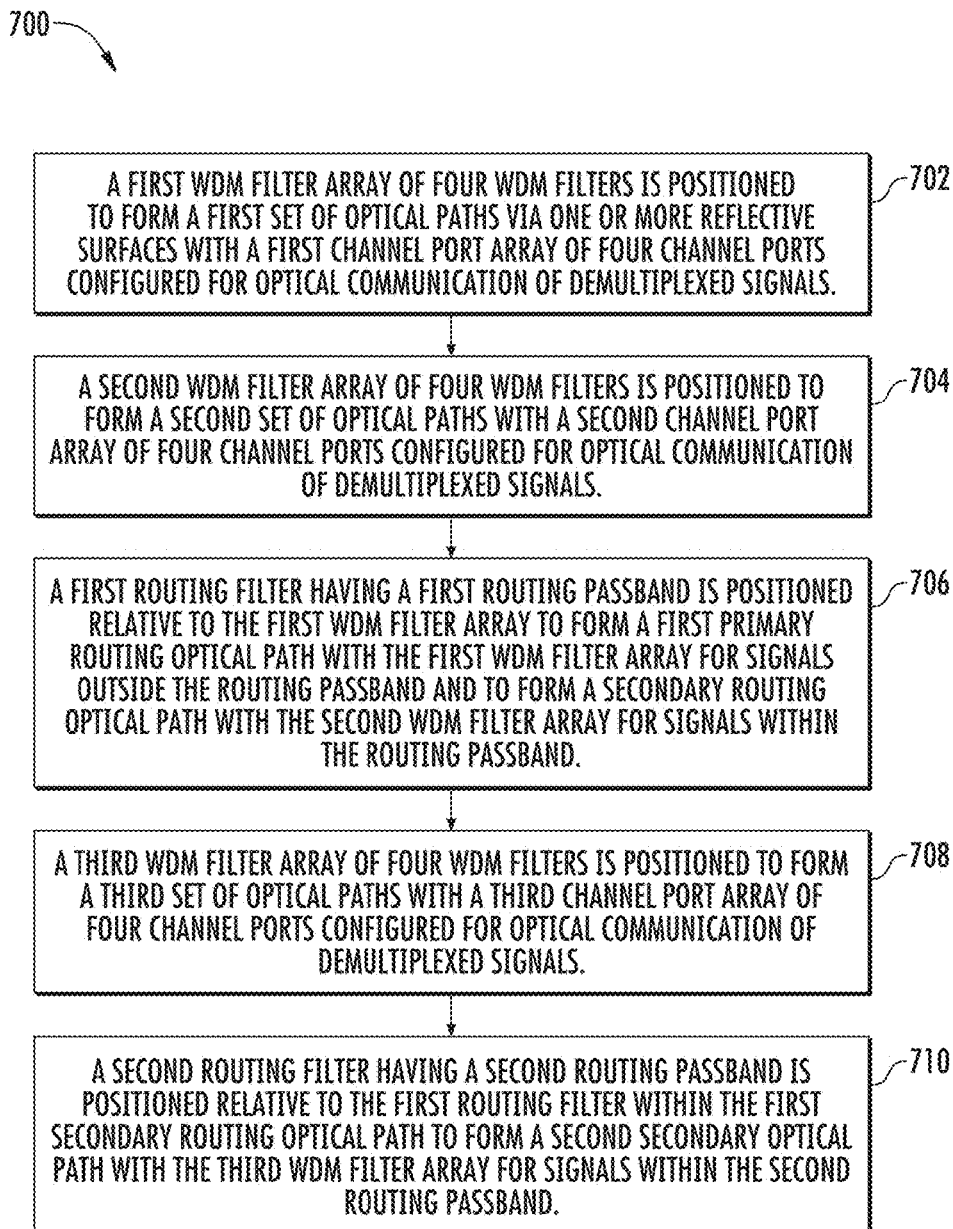
FIG. 7 is a flowchart of steps for manufacturing and tuning the WDM optical assemblies of FIGS. 2-6.

FIG. 7 is a flowchart of steps 700 for manufacturing and tuning the WDM optical assemblies of FIGS. 2-6. In step 702, a first WDM filter array of four WDM filters (each having a unique passband) is positioned to form a first set of optical paths via one or more reflective surfaces with a first channel port array of four channel ports configured for optical communication of demultiplexed signals. In step 704, a second WDM filter array of four WDM filters (each having a unique passband) is positioned to form a second set of optical paths with a second channel port array of four channel ports configured for optical communication of demultiplexed signals. In step 706, a first routing filter having a first routing passband is positioned relative to the first WDM filter array to form a first primary routing optical path with the first WDM filter array for signals outside the routing passband and to form a first secondary routing optical path with the second WDM filter array for signals within the routing passband. The first primary routing optical path between a common port and the first and second WDM filter arrays are configured for optical communication of multiplexed signals. In step 708, a third WDM filter array of four WDM filters (each having a unique passband) is positioned to form a third set of optical paths with a third channel port array of four channel ports configured for optical communication of demultiplexed signals. In step 710, a second routing filter having a second routing passband is positioned relative to the first routing filter within the first secondary routing optical path to form a second secondary optical path with the third WDM filter array for signals within the second routing passband.

FIGS. 8-12 are views of collimators for use with the WDM optical assemblies and subassemblies of FIGS. 2-6.

Figure 8:
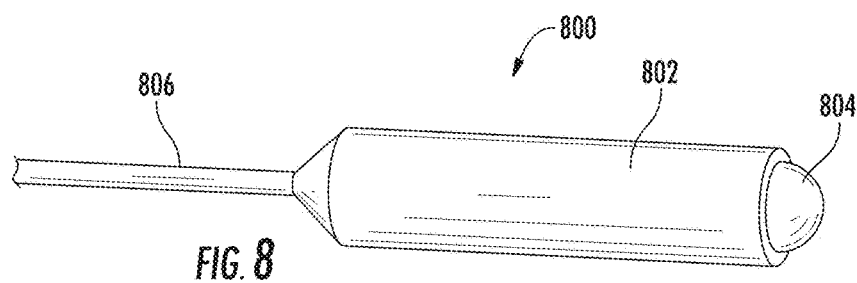
FIG. 8 is a perspective view of a steel-tube collimator for use with the WDM optical assemblies or subassemblies of FIGS. 2-6.

FIG. 8 is a perspective view of a steel-tube collimator 800 for use with the WDM optical assemblies and subassemblies of FIGS. 2-6. The collimator narrows a beam of particles or waves. In other words, the collimator causes the directions of motion to become more aligned in a specific direction. The steel-tube collimator 800 includes a steel-tube body 802, with a curved lens 804 at one end of the steel-tube body, and a fiber optic pigtail 806 at an opposite end of the steel-tube body.

Figure 9A:
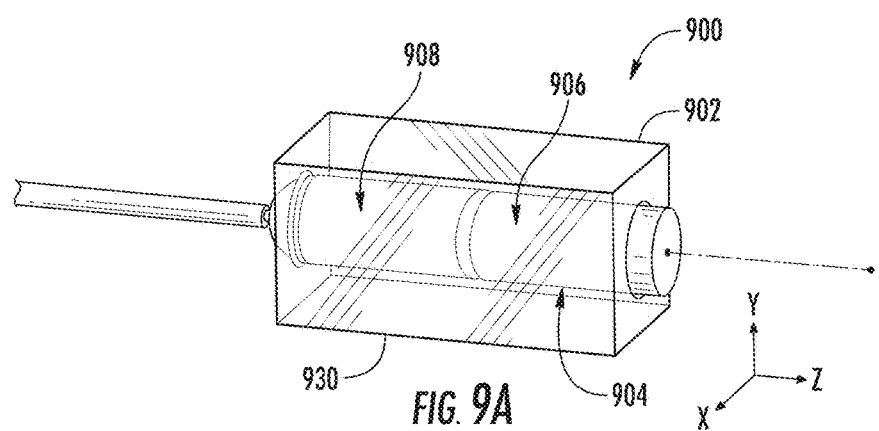
FIG. 9A is a perspective view of a square tube collimator for use with the WDM optical assemblies or subassemblies of FIGS. 2-6.
Figure 9B:
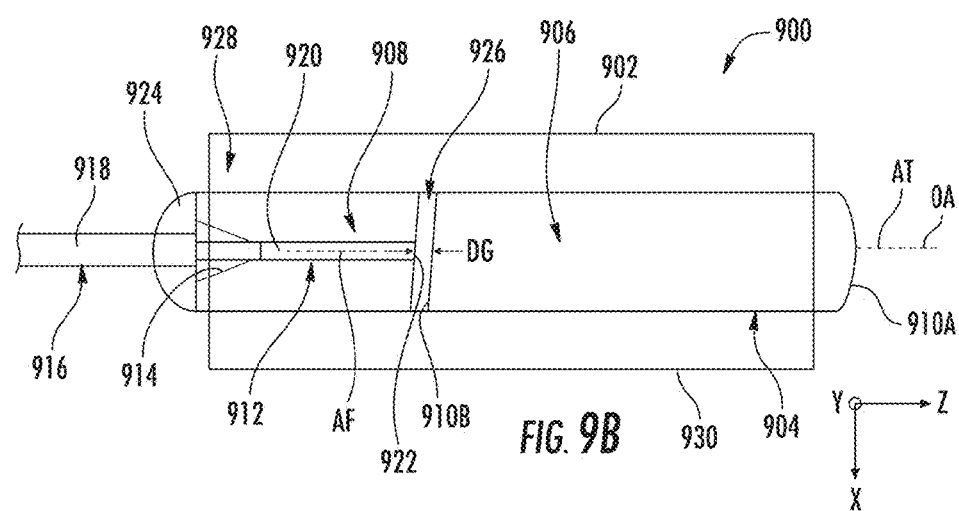
FIG. 9B is a cross-sectional top view of the square tube collimator of FIG. 9A.

FIGS. 9A and 9B are perspective views of a square tube collimator for use with the WDM optical assemblies and subassemblies of FIGS. 2-6. The square tube collimator 900 includes a glass tube 902 (e.g., cylindrical) with a central bore 904. As used herein, the term "cylindrical" is used in its most general sense and can be defined as a three-dimensional object formed by taking a two-dimensional object and projecting it in a direction perpendicular to its surface. Thus, a cylinder, as the term is used herein, is not limited to having a circular cross-section shape but can have any cross-sectional shape, such as the square cross-sectional shape described below by way of example.

The square tube collimator 900 further includes optical elements, such as a collimating lens 906, ferrule 908, etc., which can be secured to the glass tube 902 using a securing mechanism (e.g., an adhesive). The collimating lens 906 has a front surface 910A and a back surface 910B opposite thereto. In the example shown, the front surface 910A is convex while the back surface 910B can be angled, e.g., in the x-z plane as shown. In an example, the front surface 910A of collimating lens 906 can reside outside of the central bore 904, i.e., the front-end portion of the collimating lens 906 can extend slightly past the front end of the glass tube 902. In an example, the collimating lens 906 can be formed as a gradient-index (GRIN) element that has a planar front surface 910A. In an example, the collimating lens 906 can consist of a single lens element while in another example it can consist of multiple lens elements. In the discussion below, the collimating lens 906 is shown as a single lens element for ease of illustration and discussion.

The optical fiber support member is the form of a ferrule 908. The ferrule 908 includes a central bore 912 that runs between a front end and a back end along a ferrule central axis AF, which in an example is co-axial with the tube central axis AT of the glass tube 902 and the optical axis OA as defined by the collimating lens 906. The central bore 912 can include a flared portion 914 at the back end of the ferrule 908.

An optical fiber 916 has a coated portion 918, and an end portion 920 is bare glass (e.g., is stripped of the coated portion) and is thus referred to as the "bare glass portion." The bare glass portion 920 includes a polished end face 922 that defines a proximal end of the optical fiber. The bare glass portion 920 of the optical fiber 916 extends into the central bore 912 of the ferrule 908 at the back end of the ferrule. A securing element 924 can be disposed around the optical fiber 916 at the back end of the ferrule 908 to secure the optical fiber to the ferrule. The front end of the ferrule 908 is angled in the x-z plane and is axially spaced apart from the angled back end of the collimating lens to define a gap 926 that has a corresponding axial gap distance DG.

The ferrule 908, optical fiber 916, and securing element 924 constitute a fiber optic pigtail 928, which can be said to reside at least partially within the bore 904 adjacent the back end of the glass tube 902. Thus, in an example, the square tube collimator 900 includes only the glass tube 902, the collimating lens 906, and the fiber optic pigtail 928. The glass tube 902 serves in one capacity as a small lens barrel that supports and protects the collimating lens 906 and fiber optic pigtail 928, particularly the bare glass portion 920 and its polished end face 922. The glass tube 902 also serves in another capacity as a mounting member that allows for the square tube collimator 900 to be mounted to a support substrate. In this capacity, at least one flat surface 930 serves as a precision mounting surface.

In an example, the glass tube 902, the collimating lens 906, and the ferrule 908 are all made of a glass material, and further in an example, are all made of the same glass material. Making the glass tube 902, the collimating lens 906, and the ferrule 908 out of a glass material has the benefit that these components will have very close if not identical coefficients of thermal expansion (CTE). This feature is particularly advantageous in environments that can experience large swings in temperature.

In an example, the optical elements used in micro-optical systems are sized to be slightly smaller than the diameter of the bore 904 (e.g., by a few microns or tens of microns) so that the optical elements can be inserted into the bore 904 and be movable within the bore 904 to a select location. In an example, the select location is an axial position where the optical element resides for the micro-optical system to have optimum or substantially optimum optical performance. Here, substantially optimum performance means performance that may not be optimum but that is within a performance or specification for the micro-optical system.

In another example, the optical elements have a clearance with respect to the bore 904 in the range of a few microns (e.g., 2 microns or 3 microns) to tens of microns (e.g., 20 microns up to 50 microns). A relatively small value for the clearance allows for the optical elements to be well-aligned with the central bore axis AB, e.g., to within a few microns (e.g., from 2 microns to 5 microns).

The optical elements and the support/positioning elements can be inserted into and moved within the bore 904 to their select locations using micro-positioning devices. The optical elements and the support/positioning elements can be secured within the bore 904 using a number of securing techniques. One example of a securing technique uses a securing feature that is an adhesive (e.g., a curable epoxy). Another securing technique uses a securing feature that involves a glass soldering to create one or more glass solder points. Another securing technique uses glass welding to create a securing feature in the form of one or more glass welding points. A combination of these securing features can also be employed.

Thus, one or more optical elements can be secured within the bore 904 using one or more securing features and can also be supported and/or positioned using one or more support/positioning elements. The non-adhesive securing techniques described below allow for the micro-optical systems disclosed herein to remain free of adhesives so that, for example, micro-optical systems can consist of glass only.

Figure 10A:
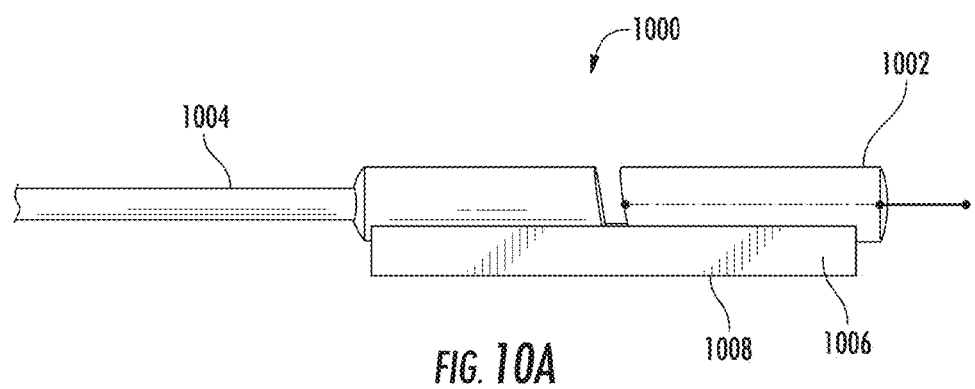
FIG. 10A is a perspective view of a compact collimator for use with the WDM optical assemblies or subassemblies of FIGS. 2-6.

FIG. 10A is a perspective view of a compact collimator for use with the WDM optical assemblies or subassemblies of FIGS. 2-6. The collimator 1000 includes a lens 1002 (e.g., a glass or silica collimating lens), a fiber optic pigtail 1004, and a groove (e.g., a generally V-shaped groove) formed in a base 1006. The lens 1002 and the fiber optic pigtail 1004 are disposed in the groove. The lens 1002 is configured to receive a light signal provided to the WDM multiplexer/demultiplexer from an external optical transmission system or provide a light signal multiplexed or demultiplexed by the WDM to an external optical transmission system. The lens 1002, for example, may be configured to receive a light signal from a fiber optic element for multiplexing or demultiplexing and/or to provide a multiplexed or demultiplexed light signal to an external fiber optic element. The fiber optic pigtail 1004 is optically coupled to the lens 1002 and is configured to provide a light signal to the lens 1002 from the external fiber optic element and/or to receive the light signal from the lens 1002 for transmission to the external fiber optic element.

In various embodiments, the lens 1002 and the fiber optic pigtail 1004 may or may not contact each other. The lens 1002 and the fiber optic pigtail 1004 may be securable to the groove independent of each other to allow for precise adjustment of a pointing angle between an optical beam from the collimator 1000 and a side and/or bottom surface of the groove. In addition, the lens 1002 and fiber optic pigtail 1004 may have the same outer diameter.

The base 1006 of the collimator 1000 has a generally flat bottom surface 1008 for mounting on a substrate of a WDM multiplexer/demultiplexer or other optical system. The base 1006 further includes a width that is less than a width of the lens 1002 and a width of the fiber optic pigtail 1004.

Figure 10B:
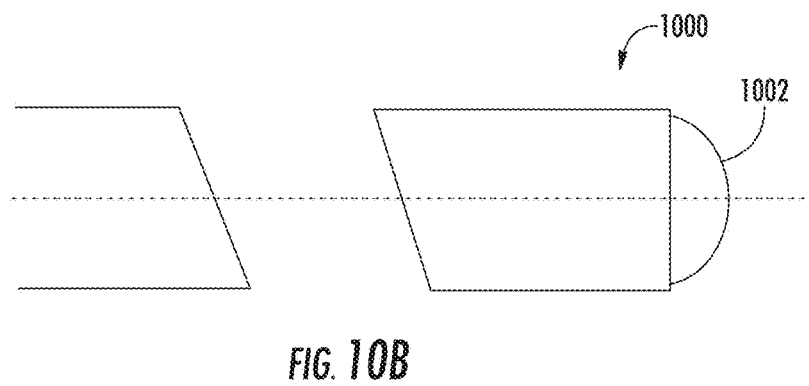
FIG. 10B is a side view of the compact collimator of FIG. 10A.

FIG. 10B is a side view of the compact collimator of FIG. 10A. A pointing angle between an optical beam from a collimator 1000 and the side and bottom surface of the groove can be eliminated (or at least reduced) by controlling the relative position between the lens 1002 and the fiber optic pigtail 1004 of the collimator 1000. By fine tuning the position of fiber optic pigtail 1004 to make an outgoing beam come across a focal point of the lens 1002, a collimated zero pointing angled beam with negligible off axis offset can be achieved. In one embodiment, for example, the tuning can be monitored by near field and far field beam position comparison (e.g., using a beam scanner). The zero pointing angle collimating components are easier to attach to the substrate with little inclination, and more reliable bonding is possible due to the uniform epoxy or bonding agent. It is noted that FIG. 10B is a schematic illustration used to illustrate concepts of the description and that the ends of the glass lens and the fiber optic pigtail 1004 may be oriented at other angles, including perpendicular, to the body of the glass lens and the fiber optic pigtail, respectively.

The structures of the collimator 1000 allow for easier modularization and remove redundant degrees of freedom versus designs in which a collimator is coupled and attached to the substrate via external wedges or supports. Thus, the collimator 1000 may reduce the complexity and further increase the assembly efficiency and process reliability of the overall multiplexer/demultiplexer design.

Figure 11A:
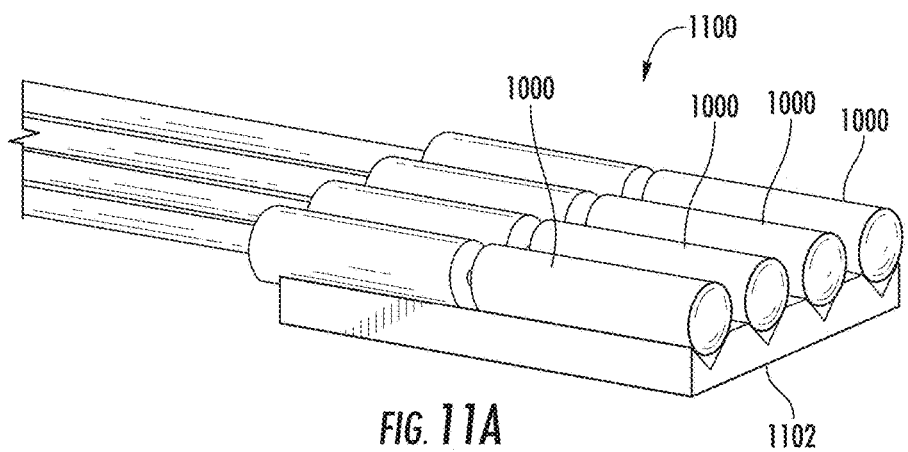
FIG. 11A is a perspective view of an array of the compact collimators of FIGS. 10A and 10B.
Figure 11B:
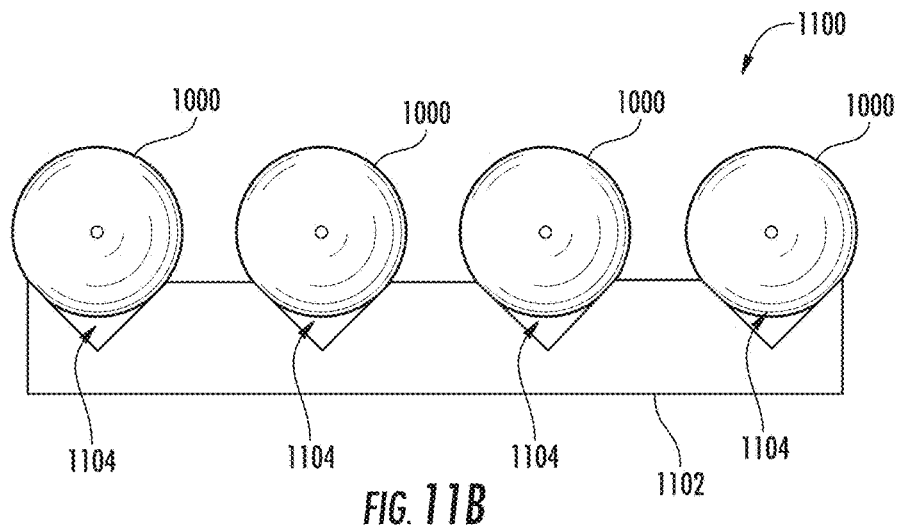
FIG. 11B is a front view of the array of compact collimators of FIG. 11A.

FIGS. 11A-11B are views of an array 1100 of the collimators 1000 of FIGS. 10A-10B. The collimators 1000 are arranged side-by-side on a surface of a substrate 1102, the substrate 1102 including a plurality of grooves 1104 (discussed above). The grooves 1104 could be v-grooves or any other type of groove. A spacing between the substrate 1102 of the side-by-side collimators 1100 is greater than a spacing between the lenses 1002 and fiber optic pigtails 1004 of the side-by-side collimators 1100.

Figure 12:
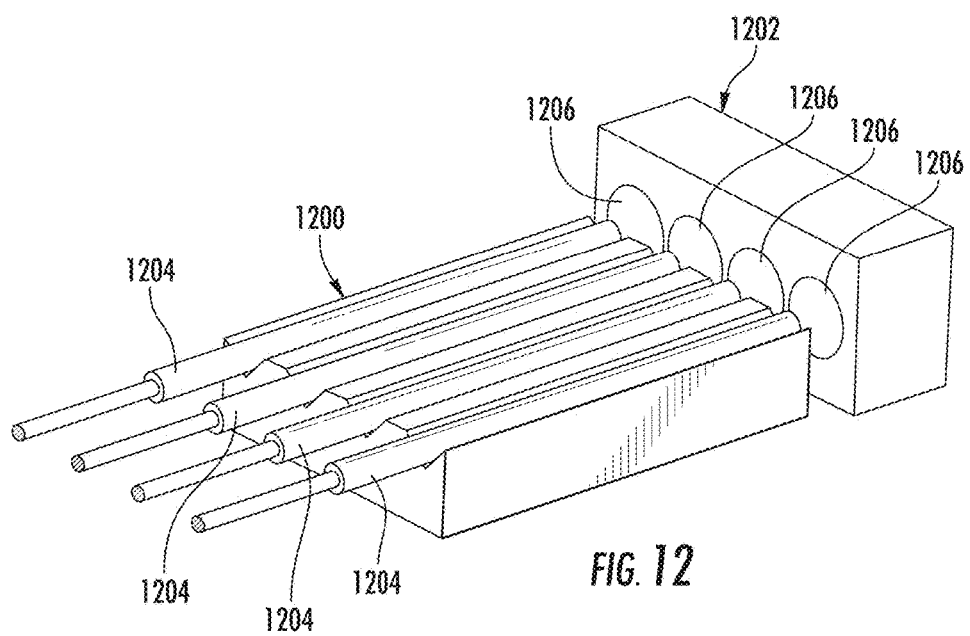
FIG. 12 is a perspective view of another exemplary embodiment of a fiber array unit (FAU) for use with the WDM optical assemblies or subassemblies of FIGS. 2-6.

FIG. 12 is a perspective view of another exemplary embodiment of a fiber array unit (FAU) 1200 and multi-lens array (MLA) 1202 for use with the WDM optical assemblies or subassemblies of FIGS. 2-6. More specifically, the FAU 1200 includes a plurality of fibers 1204, and the MLA 1202 includes a plurality of lenses 1206. The FAU 1200 and MLA 1202 can be used with any of the embodiments discussed above.

It will be apparent to those skilled in the art that various modifications and variations can be made without departing from the spirit or scope of the invention.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A wavelength-division multiplexing (WDM) optical assembly configured to direct multiplexed signals, comprising:

a first routing filter comprising a first surface and a second surface opposite the first surface, at least a portion of the first surface comprising a transmissive surface and at least a portion of the second surface comprising a wavelength selective surface, the first routing filter having a first routing passband for routing the multiplexed signals into a first primary routing optical path and a first secondary routing optical path, the first primary routing optical path being for signals outside the first routing passband, and the first secondary routing optical path being for signals within the first routing passband, a first optical subassembly for routing signals of the first primary routing optical path, the first optical subassembly comprising a plurality of first WDM filters, at least one first primary reflective surface, and an optical signal router wherein:

the plurality of first WDM filters each has a unique passband to allow signals of the first primary routing optical path that are within the unique passband to pass through an associated one of the plurality of first WDM filters, at least one of the plurality of first WDM filters is configured to reflect signals of the first primary routing optical path that are not within the first routing passband toward the at least one first primary reflective surface;

the at least one first primary reflective surface is configured to redirect any signals of the first primary routing optical path that are received from one of the plurality of first WDM filters to a different one of the plurality of first WDM filters;

the optical signal router comprises a first side and a second side opposite the first side, at least a portion of the first side comprising the at least one first primary reflective surface, and at least a portion of the second side comprising a transmissive surface; and the first surface of the first routing filter is positioned proximate the second side of the optical signal router and a depth between the first surface of the first routing filter and the second surface of the first routing filter is configured to establish a pitch of the first primary routing optical path; and a second optical subassembly for routing signals of the first secondary routing optical path, the second optical subassembly comprising a plurality of second WDM filters and at least one first secondary reflective surface, wherein:

the plurality of second WDM filters each has a unique passband to allow signals of the first secondary routing optical path that are within the unique passband to pass through an associated one of the plurality of second WDM filters, at least one of the plurality of second WDM filters is configured to reflect signals of the first secondary routing optical path that are not within the second passband toward the at least one first secondary reflective surface; and the at least one first secondary reflective surface is configured to redirect any signals of the first secondary routing optical path that are received from one of the plurality of second WDM filters to a different one of the plurality of second WDM filters.

2. The WDM optical assembly of claim 1, wherein the first primary routing optical path is in optical communication with a first group of channel ports.

3. The WDM optical assembly of claim 2, wherein the first secondary routing optical path is in optical communication with a second group of channel ports.

4. The WDM optical assembly of claim 3, further comprising a second routing filter having a second routing passband, the second routing filter positioned within the first secondary routing optical path and forming a second primary routing optical path for signals outside of the second routing passband and a second secondary routing optical path for signals within the second routing passband.

5. The WDM optical assembly of claim 4, wherein the second routing filter directs the second primary routing optical path to the plurality of second WDM filters.

6. The WDM optical assembly of claim 5, further comprising:

a third optical subassembly for routing signals of the second secondary routing optical path, the third optical subassembly comprising a plurality of third WDM filters and at least one second secondary reflective surface, wherein:

the plurality of third WDM filters each has a unique passband to allow signals of the second secondary routing optical path that are within the unique passband to pass through an associated one of the plurality of third WDM filters, at least one of the plurality of third WDM filters is configured to reflect signals of the second secondary routing optical path that are not within the third passband toward the at least one second secondary reflective surface; and the at least one second secondary reflective surface is configured to redirect any signals of the second secondary routing optical path that are received from one of the plurality of third WDM filters to a different one of the plurality of third WDM filters.

7. The WDM optical assembly of claim 1, wherein the plurality of first WDM filters are positioned proximate the second side of the optical signal router.

8. The WDM optical assembly of claim 7, wherein the first routing filter and the plurality of first WDM filters are mounted to the second side of the optical signal router.

9. A method of manufacturing a wavelength-division multiplexing (WDM) optical assembly configured to direct multiplexed signals, comprising:

positioning a first routing filter on a substrate, the first routing filter comprising a first surface and a second surface opposite the first surface, at least a portion of the first surface comprising a transmissive surface and at least a portion of the second surface comprising a wavelength selective surface, the first routing filter having a first routing passband for routing the multiplexed signals into a first primary routing optical path and a first secondary routing optical path, the first primary routing optical path being for signals outside the first routing passband, and the first secondary routing optical path being for signals within the first routing passband, positioning a first optical subassembly for routing signals of the first primary routing optical path, the first optical subassembly comprising a plurality of first WDM filters, at least one first primary reflective surface, and an optical signal router wherein:

the plurality of first WDM filters each has a unique passband to allow signals of the first primary routing optical path that are within the unique passband to pass through an associated one of the plurality of first WDM filters, at least one of the plurality of first WDM filters is configured to reflect signals of the first primary routing optical path that are not within the first routing passband toward the at least one first primary reflective surface;

the at least one first primary reflective surface is configured to redirect any signals of the first primary routing optical path that are received from one of the plurality of first WDM filters to a different one of the plurality of first WDM filters;

the optical signal router comprises a first side and a second side opposite the first side, at least a portion of the first side comprising the at least one first primary reflective surface, and at least a portion of the second side comprising a transmissive surface; and the first surface of the first routing filter is positioned proximate the second side of the optical signal router and a depth between the first surface of the first routing filter and the second surface of the first routing filter is configured to establish a pitch of the first primary routing optical path; and positioning a second optical subassembly for routing signals of the first secondary routing optical path, the second optical subassembly comprising a plurality of second WDM filters and at least one first secondary reflective surface, wherein:

the plurality of second WDM filters each has a unique passband to allow signals of the first secondary routing optical path that are within the unique passband to pass through an associated one of the plurality of second WDM filters,
at least one of the plurality of second WDM filters is configured to reflect signals of the first secondary routing optical path that are not within the second passband toward the at least one first secondary reflective surface; and
the at least one first secondary reflective surface is configured to redirect any signals of the first secondary routing optical path that are received from one of the plurality of second WDM filters to a different one of the plurality of second WDM filters.

10. The method of claim 9, further comprising positioning a first group of channel ports on the substrate so that the first group of channel ports are in optical communication with the first primary routing optical path.

11. The method of claim 10, further comprising positioning a second group of channel ports on the substrate so that the second group of channel ports are in optical communication with the first secondary routing optical path.

12. A wavelength-division multiplexing (WDM) device configured to direct multiplexed signals, comprising:
a housing;
a common collimator positioned within the housing;
a common fiber optic pigtail operatively coupled to the common collimator and extending from the housing;
a first group of channel collimators positioned within the housing and each having a channel fiber optic pigtail extending from the housing;
a second group of channel collimators positioned within the housing and each having a channel fiber optic pigtail extending from the housing; and
a wavelength-division multiplexing (WDM) optical assembly, comprising:
a first routing filter comprising a first surface and a second surface opposite the first surface, at least a portion of the first surface comprising a transmissive surface and at least a portion of the second surface comprising a wavelength selective surface, the first routing filter having a first routing passband for routing the multiplexed signals from the common collimator into a first primary routing optical path and a first secondary routing optical path, the first primary routing optical path being for signals outside the first routing passband, and the first secondary routing optical path being for signals within the first routing passband,
a first optical subassembly for routing signals of the first primary routing optical path to the first group of channel collimators, the first optical subassembly comprising a plurality of first WDM filters, at least one first primary reflective surface, and an optical signal router wherein:
the plurality of first WDM filters each has a unique passband to allow signals of the first primary routing optical path that are within the unique passband to pass through an associated one of the plurality of first WDM filters to a corresponding channel collimator of the first group of channel collimators,
at least one of the plurality of first WDM filters is configured to reflect signals of the first primary routing optical path that are not within the first routing passband toward the at least one first primary reflective surface; and
the at least one first primary reflective surface is configured to redirect any signals of the first primary routing optical path that are received from one of the plurality of first WDM filters to a different one of the plurality of first WDM filters;
the optical signal router comprises a first side and a second side opposite the first side, at least a portion of the first side comprising the at least one first primary reflective surface, and at least a portion of the second side comprising a transmissive surface; and
the first surface of the first routing filter is positioned proximate the second side of the optical signal router and a depth between the first surface of the first routing filter and the second surface of the first routing filter is configured to establish a pitch of the first primary routing optical path; and
a second optical subassembly for routing signals of the first secondary routing optical path to the second group of channel collimators, the second optical subassembly comprising a plurality of second WDM filters and at least one first secondary reflective surface, wherein:
the plurality of second WDM filters each has a unique passband to allow signals of the first secondary routing optical path that are within the unique passband to pass through an associated one of the plurality of second WDM filters to a corresponding channel collimator of the second group of channel collimators,
at least one of the plurality of second WDM filters is configured to reflect signals of the first secondary routing optical path that are not within the second passband toward the at least one first secondary reflective surface; and
the at least one first secondary reflective surface is configured to redirect any signals of the first secondary routing optical path that are received from one of the plurality of second WDM filters to a different one of the plurality of second WDM filters.

13. The WDM device of claim 12, further comprising:
a third group of channel collimators positioned within the housing and each having a fiber optic pigtail operatively extending from the housing; and
a third optical subassembly for routing signals of the second secondary routing optical path, the third optical subassembly comprising a plurality of third WDM filters and at least one second secondary reflective surface, wherein:
the plurality of third WDM filters each has a unique passband to allow signals of the second secondary routing optical path that are within the unique passband to pass through an associated one of the plurality of third WDM filters to a corresponding channel collimator of the third group of channel collimators,
at least one of the plurality of third WDM filters is configured to reflect signals of the second secondary routing optical path that are not within the third passband toward the at least one second secondary reflective surface; and
the at least one second secondary reflective surface is configured to redirect any signals of the second secondary routing optical path that are received from one of the plurality of third WDM filters to a different one of the plurality of third WDM filters.

* * * * *